(12) United States Patent
Rodrigues et al.

(10) Patent No.: US 10,399,787 B2
(45) Date of Patent: Sep. 3, 2019

(54) CONVEYOR AND CONVEYOR DRIVE FOR FILLING A COMBINE GRAIN TANK

(71) Applicant: DEERE & COMPANY, Moline, IL (US)

(72) Inventors: Alexandre C. Rodrigues, Tenente Portela (BR); Chad R. Borkgren, Coal Valley, IL (US); Brian J. Tank, Milan, IL (US); Zachary Saylor, Bettendorf, IA (US); Matthew L. Douglas, Rock Island, IL (US); Alexander B. Lassers, Davenport, IA (US); Douglas G. Temple, Fulton, IL (US); Joshua R. Wilhelm, Davenport, IA (US)

(73) Assignee: Deere & Company, Moline, IL (US)

( * ) Notice: Subject to any disclaimer, the term of this patent is extended or adjusted under 35 U.S.C. 154(b) by 226 days.

(21) Appl. No.: 15/070,037

(22) Filed: Mar. 15, 2016

(65) Prior Publication Data

US 2017/0265389 A1 Sep. 21, 2017

(51) Int. Cl.
| | |
|---|---|
| *B65G 33/32* | (2006.01) |
| *A01D 90/02* | (2006.01) |
| *B65G 33/14* | (2006.01) |
| *A01F 12/46* | (2006.01) |
| *A01D 69/08* | (2006.01) |

(52) U.S. Cl.
CPC .............. *B65G 33/32* (2013.01); *A01D 69/08* (2013.01); *A01D 90/02* (2013.01); *A01F 12/46* (2013.01); *B65G 33/14* (2013.01)

(58) Field of Classification Search
CPC .......... F16D 1/104; F16D 1/108; F16D 1/112; F16D 1/116; F16D 2001/102; F16D 2001/103; A01D 41/1208; A01D 41/1217; A01D 41/1226; A01D 90/02; A01D 90/10; A01D 90/14; B65G 33/32; B65G 33/14; B65G 2814/0326; B65G 2814/0332; B65G 67/04; B65G 67/22; B65G 67/24; A01F 12/46; A01F 12/60; B60P 1/40

See application file for complete search history.

(56) References Cited

U.S. PATENT DOCUMENTS

| | | | | |
|---|---|---|---|---|
| 2,319,588 A | * | 5/1943 | Dreese ................... | B65G 65/00 414/523 |
| 3,286,862 A | * | 11/1966 | Hansen .................. | A01D 90/10 198/314 |

(Continued)

FOREIGN PATENT DOCUMENTS

EP         2918869 A2       9/2015

OTHER PUBLICATIONS

European Search Report in foreign counterpart application No. 17159635.6 dated Jul. 24, 2017 (6 pages).

*Primary Examiner* — Glenn F Myers
(74) *Attorney, Agent, or Firm* — Rathe Lindenbaum LLP

(57) ABSTRACT

A conveyor and conveyor drive for filling a combine grain tank includes a chain and paddle conveyor in a housing (114) that feeds an intermediate chamber (116), a gearbox with a first coupling element (208), the first coupling element (208) having teeth (230) with holes therethrough to permit the expulsion of grain from between the first coupling element (208) and a second coupling element (210) that is connected to a pivoting auger conveyor (104).

20 Claims, 5 Drawing Sheets

(56) References Cited

U.S. PATENT DOCUMENTS

| | | | | |
|---|---|---|---|---|
| 3,503,533 | A | * | 3/1970 | Bichel ................. A01D 41/1208 414/502 |
| 4,008,819 | A | * | 2/1977 | Hanaway ........... A01D 41/1208 198/668 |
| 4,641,743 | A | * | 2/1987 | Kemp, Jr. ............... B65G 33/32 198/666 |
| 5,443,854 | A | * | 8/1995 | Cummins ................. A21C 1/06 425/145 |
| 5,695,398 | A | | 12/1997 | Carlson et al. |
| 5,695,399 | A | * | 12/1997 | Carlson .............. A01D 41/1208 414/505 |
| 6,422,376 | B1 | | 7/2002 | Nichols et al. |
| 7,367,881 | B2 | * | 5/2008 | Voss ................... A01D 41/1217 414/526 |
| 2009/0156278 | A1 | * | 6/2009 | Cooksey ............ A01D 41/1208 460/114 |
| 2009/0309006 | A1 | * | 12/2009 | Johnsgaard ............. B65G 65/46 248/672 |
| 2012/0138410 | A1 | * | 6/2012 | Vogel ...................... F16D 1/104 192/69.9 |
| 2015/0296709 | A1 | | 10/2015 | Patterson et al. |
| 2015/0313080 | A1 | * | 11/2015 | Matousek .......... A01D 41/1208 414/468 |
| 2015/0330455 | A1 | * | 11/2015 | Tesar ...................... F16D 1/116 464/81 |
| 2017/0055454 | A1 | * | 3/2017 | Michael ................... B60P 1/42 |

* cited by examiner

CONVEYOR AND CONVEYOR DRIVE FOR FILLING A COMBINE GRAIN TANK

FIELD OF THE INVENTION

This invention relates to agricultural combines. More particularly it relates to conveyors in agricultural combines that convey crop material. More particularly, it relates to auger conveyors for conveying crop material.

BACKGROUND OF THE INVENTION

Agricultural combines sever crop material from the ground. They carry the cut crop material into threshing, separating, and cleaning devices. After cleaning, agricultural combines convey the grain that remains upward into a grain tank, where the grain is deposited and awaits transfer to a secondary vehicle such as a grain cart or truck.

In order to provide access to conveying components for cleaning and repair, many of the components are arranged to be easily engaged and disengaged. To provide this easy engagement and disengagement, the conveyors are often coupled to the conveyor drives with toothed gears, cogs, and the like.

Couplers such as these provide for easy engagement and disengagement. The conveyors are often supported on pivots or swivels that permit the conveyor and the conveyor drive to be pivoted apart and then pivoted back together. One problem with these arrangements is fouling by crop matter. When the conveyors are pivoted away from their conveyor drives, crop material, such as grain, can fill the gap between the two and become interposed between the mating drive elements.

It can be time-consuming to scoop all the crop material away from the two elements of the coupler that couple the conveyor drive to the conveyor so they can be pivoted back together into driving engagement.

What is needed is a conveyor that can tolerate being fouled with grain. What is also needed is a conveyor arrangement that automatically clears itself of any fouling.

It is an object of this invention to provide such a conveyor for an agricultural combine.

SUMMARY OF THE INVENTION

In accordance with a first aspect of the invention, a conveyor and conveyor drive for filling a combine grain tank is provided that comprises a chain and paddle conveyor disposed inside a generally vertical housing: an intermediate chamber in communication with the chain and paddle conveyor to receive grain from the chain and paddle conveyor; a gearbox that is fixed to and extends into the intermediate chamber, the gearbox driving a first coupling element around a first rotational axis, wherein the first coupling element is disposed inside the intermediate chamber, is generally circular, and has a first face defining a first plurality of teeth and a second opposing face; and an auger conveyor having an inlet and an outlet, wherein the auger conveyor comprises a conveyor tube and an auger disposed inside the conveyor tube, wherein the conveyor tube and the auger are dimensioned such that rotation of the auger within the conveyor tube conveys grain from the inlet to the outlet and wherein the auger is coupled to and driven by a second coupling element that is generally circular, and has a first face defining a second plurality of teeth; wherein each of the teeth of the first coupling element is configured to engage with a corresponding tooth of the second coupling element to communicate torque from the first coupling element to the second coupling element and to drive the auger in rotation, and wherein each of the teeth of the first coupling element defines a through-hole extending completely through from the first face to the second opposing face of each of the teeth, and further wherein the through-hole is large enough to permit grain being conveyed by the auger conveyor to pass therethrough.

The auger conveyor may be pivotally supported within the grain tank and may be pivotable to a disengaged position in which the auger conveyor is separated from the intermediate chamber and wherein the teeth of the first coupling element may be disconnected from the teeth of the second coupling element.

The auger conveyor may be pivotable to an engaged position in which the auger conveyor is coupled to the intermediate chamber and wherein the teeth of the first coupling element are drivingly coupled to the teeth of the second coupling element.

The conveyor and conveyor drive may further comprise a cylindrical shell in which the cylindrical shell is fixed to the auger conveyor, wherein cylindrical shell surrounds the second coupling element in the disengaged position, and wherein the cylindrical shell surrounds both the first coupling element and the second coupling element in the engaged position.

The second coupling element may be slidably supported on the auger to translate to a plurality of operating positions on the auger in a direction parallel to the rotational axis of the auger.

The conveyor and conveyor drive may further comprise a spring coupled to the auger and to the second coupling element, wherein the spring applies a spring force to the second coupling element in a direction toward the first coupling element.

The spring force may be communicated to grain disposed between the first coupling element and the second coupling element and wherein said spring force is sufficient to expel grain trapped between the teeth of the first coupling element and the teeth of the second coupling element.

The conveyor and conveyor drive may further comprise a shaft fixed to the second coupling element, wherein the shaft is slidably supported in an aperture formed in a lower end of the auger; a coil spring coiled about the shaft to preload the second coupling element; and a bellows extending about the shaft and disposed to prevent grain from entering between the shaft and the aperture.

Each of the teeth of the first coupling element may define a first surface that extends radially outward from a rotational axis of the first coupling element and extends in a direction generally parallel to the rotational axis, and further wherein each of the teeth of the first coupling element defines a second surface that is generally helical with respect to the rotational axis and is disposed at an angle of between 25 degrees and 45 degrees with respect to a plane that is normal to the rotational axis.

The through-hole of each tooth may be formed in the second surface and may extend in a direction parallel to the rotational axis of the first coupling element.

DETAILED DESCRIPTION OF THE DRAWINGS

Figure 1:
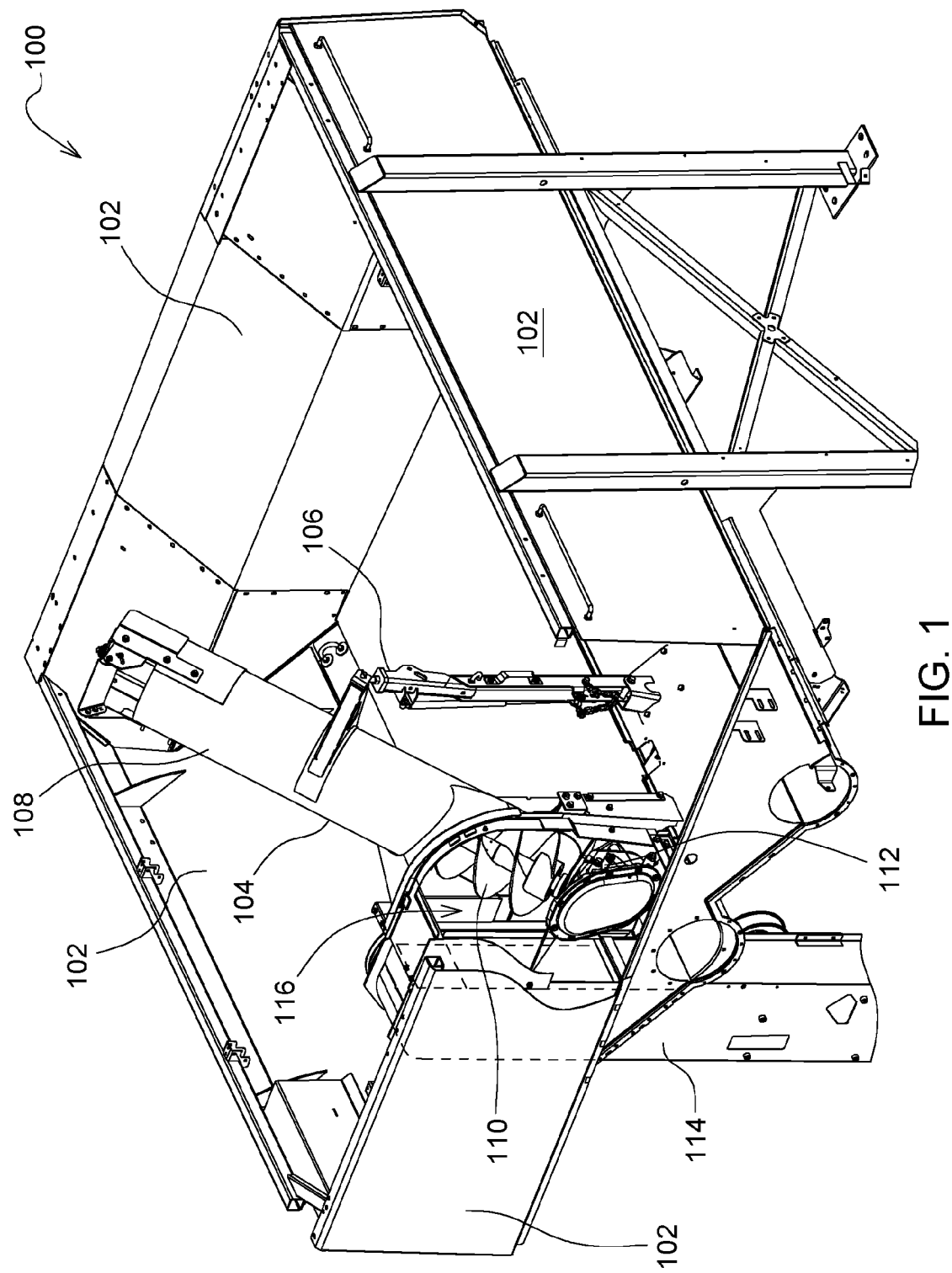
FIG. 1 is a partial cutaway perspective view of a grain tank of an agricultural combine with a conveyor in accordance with the present invention.

Referring to FIG. 1, a grain tank 100 of an agricultural combine comprises walls 102 and a conveyor 104. The conveyor 104 supported on a pivoting conveyor support 106 that extends upward into a central region of the grain tank 100.

The conveyor 104 is an auger conveyor. It comprises a conveyor tube 108 and an auger 110 disposed inside the conveyor tube. The conveyor 104 conveys material by rotation of the auger 110 within the conveyor tube 108. The conveyor 104 is disposed within the body of the grain tank 100 and is tilted with respect to a vertical direction at an angle of approximately 45° with respect to vertical. The auger 110 is driven inside the conveyor tube 108 such that grain is lifted up from the lower end of the conveyor 104 and is released at the upper end of the conveyor 104. The upper end of the conveyor 104 is disposed such that grain released from the upper end fills the grain tank 100. The conveyor 104 is driven by a conveyor drive 112 that is supported on and extends through a wall of the grain tank.

In operation, clean grain is carried upward by a chain-and-paddle conveyor disposed within a vertical housing 114. Upon reaching the top of the vertical housing 114, the grain is released into the upper end of an intermediate chamber 116 disposed at one side of the grain tank 100. The grain fills this intermediate chamber 116 and submerges the lower end of the auger 110.

As the auger 110 rotates, it pulls the grain flooding the intermediate chamber 116 upward inside the conveyor tube 108 and deposits the grain into the grain tank 100. The conveyor tube 108 seals against an aperture in the lower end of the intermediate chamber 116, thereby preventing the grain from flowing directly into the grain tank 100.

Figure 2:
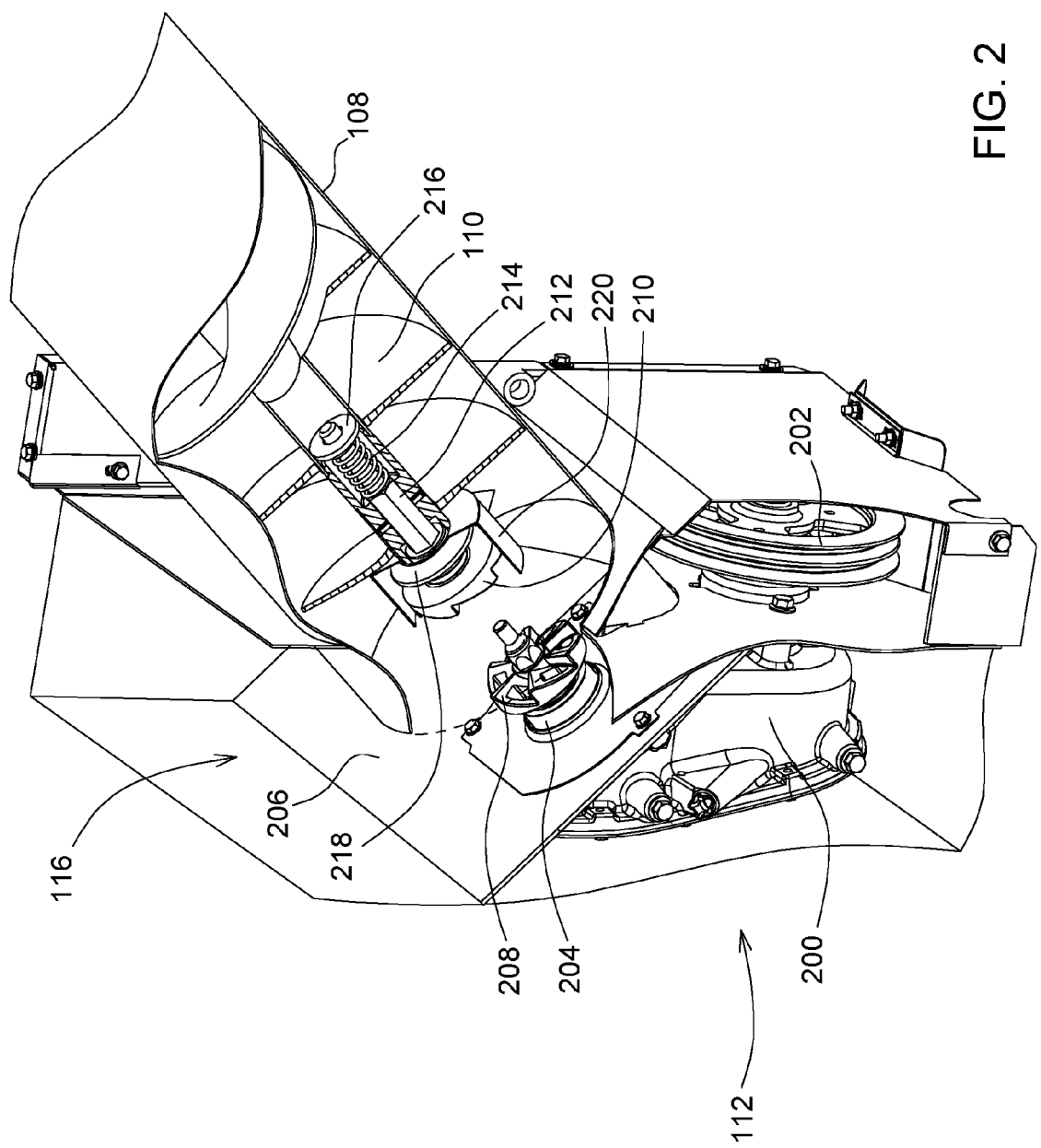
FIG. 2 is a perspective view of a conveyor drive and a conveyor auger in a pivoted-apart (i.e. disengaged) position showing the conveyor drive elements and how they are supported.
Figure 3:
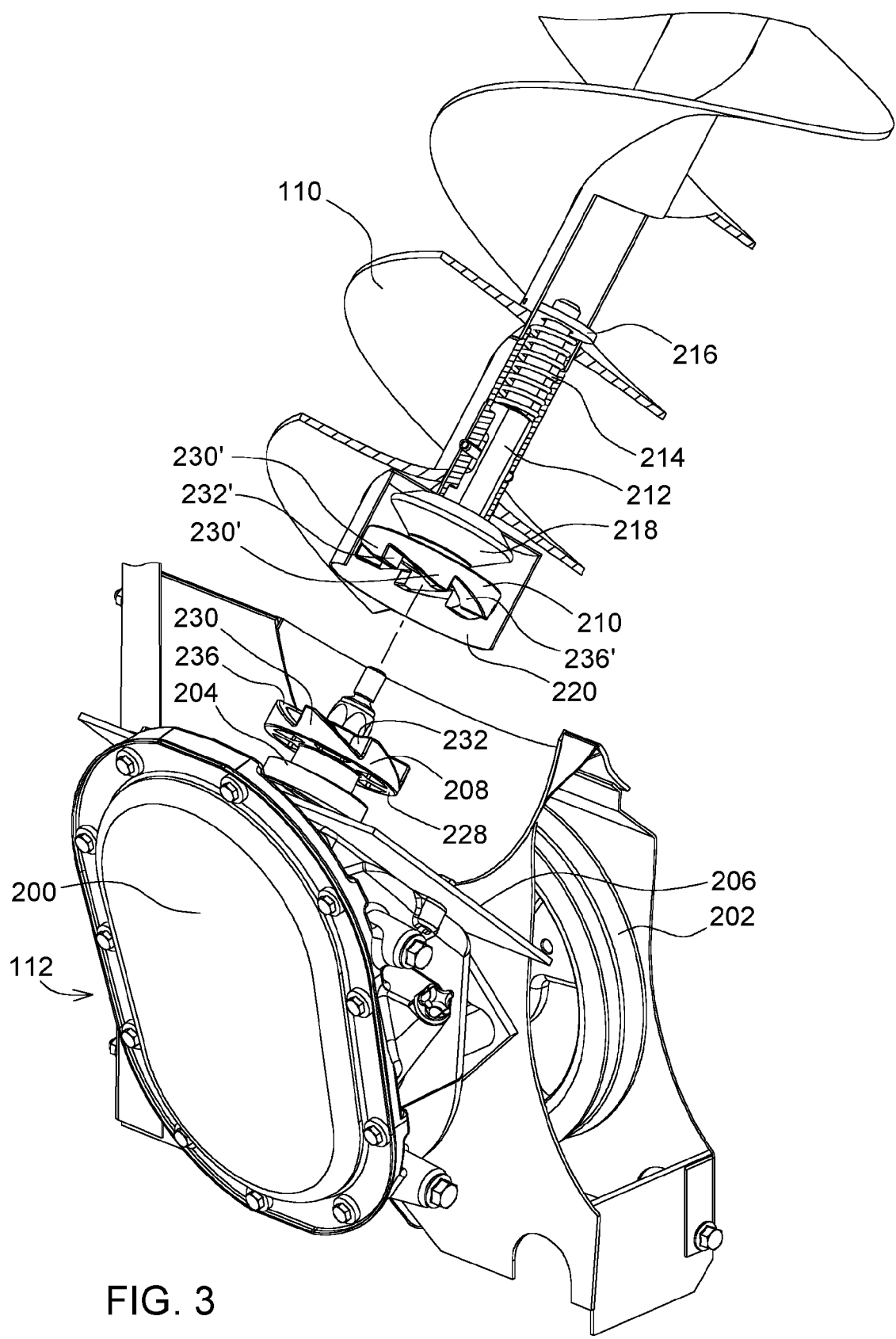
FIG. 3 is another cross-sectional perspective view of the conveyor drive shown in FIG. 2.

In FIGS. 2 and 3, the auger 110 is shown separated from the conveyor drive 112. This shows the relative positions of the auger 110 with respect to the conveyor drive 112 when the auger 110 has been pivoted away from the conveyor drive 112. Referring to FIGS. 2 and 3, the conveyor drive 112 includes a gearbox 200 that is driven by a pulley 202. The pulley 202 is coupled to and drives an output shaft 204 by means of gears disposed inside the gearbox 200. The output shaft 204 extends upward and through an angled wall 206 that defines the bottom of the intermediate chamber 116. The angled wall 206 (shown cutaway in FIGS. 2-3) prevents the grain entering the intermediate chamber 116 from falling on the ground. The angled wall 206 directs the grain falling into the intermediate chamber 116 toward the lower end of the auger 110.

A first coupling element 208 is fixed to the output shaft 204 to rotate with the output shaft 204. A second coupling element 210 is fixed to the lower end of the auger 110. The first coupling element 208 and the second coupling element 210 engage each other and communicate rotary power from the first coupling element 208 to the auger 110 when conveyor 104 is pivoted to its engaged (working) position.

The second coupling element 210 is fixed to the end of a shaft 212. The shaft 212 extends into the lower end of the auger 110. The shaft 212 is hexagonal in cross-section and is supported in a hexagonal hole in the lower end of the auger 110. An upper portion of the shaft 212 is surrounded by a coil spring 214 which abuts a spring retainer 216 at an upper end of the spring that is fixed to the auger 110, and abuts the hexagonal portion of the shaft 212 at a lower end of the spring. Thus, the second coupling element 210 and a shaft 212 are spring-loaded toward the first coupling element 208.

A bellows 218 surrounds a lower portion of the shaft 212 just behind the second coupling element 210. The lower portion of shaft 212, the bellows 218, and the second coupling element 210 are disposed inside a cylindrical shell 220 that is fixed at its upper end to the lower end of auger 110. As will be shown in the succeeding pictures, pressure applied to the second coupling element 210 causes it to press against the shaft 212, which moves upward into the auger 110, compressing the coil spring 214 and compressing the bellows 218. The bellows 218 acts as a seal between the second coupling element 210 and the hole in which the shaft 212 is received in the lower end of the auger 110. This keeps grain and other contaminants from entering into the gap between the shaft 212 and the hole in which it is supported. These contaminants might otherwise cause the shaft 212 to become seized in the hole in the end of auger 110, and not slide easily up and down.

The cylindrical shell 220 protects the second coupling element 210, the bellows 218, and the shaft 212 from damage. The cylindrical shell 220 has an open lower end to permit the second coupling element 210 to engage the first coupling element 208 when the conveyor 104 is pivoted into contact with the first coupling element 208.

Figure 4:
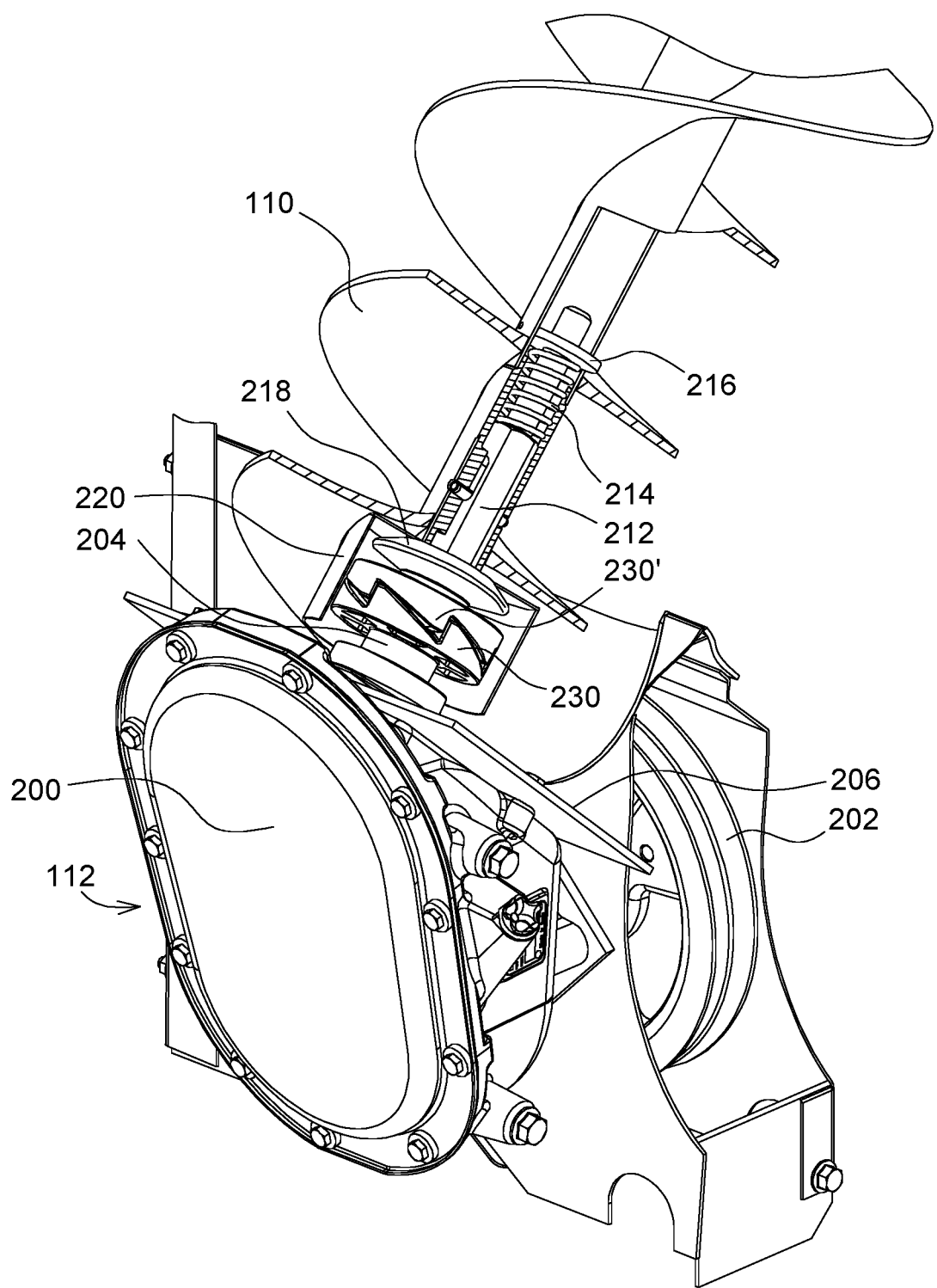
FIG. 4 is a cross-sectional perspective view of the conveyor drive shown in FIGS. 2-3, wherein the conveyor drive and the conveyor auger are shown in a pivoted-together (i.e. in the engaged position).

In FIG. 4, the auger 110 and conveyor drive 112 can be seen in their coupled (i.e. engaged) position. The conveyor 104 has been pivoted into position and pressed against the first coupling element 208. The teeth of the first coupling element 208 and the teeth of the second coupling element 210 interengage. The pressure of the first coupling element 208 against the second coupling element 210 has caused the second coupling element 210 and the shaft 212 upon which it is mounted to be pushed further into the auger 110 that is shown in FIGS. 2-3. The coil spring 214 provides a constant counterforce against the shaft 212, which presses the second coupling element 210 against the first coupling element 208. Both the first coupling element 208 and the second coupling element 210 are surrounded by the cylindrical shell 220 which does not translate with the shaft 212. Thus, the first coupling element 208 is shielded by the cylindrical shell 220 when the auger 110 is engaged to and driven by the conveyor drive 112.

The first coupling element 208 and the second coupling element 210 are generally circular and define generally circular and cylindrical outer walls 222. The outer walls 222 are closely spaced to an inner circular and cylindrical wall 224 of the cylindrical shell 220 in order to help keep kernels of grain from intruding into the space occupied by the bellows 218.

Figure 5:
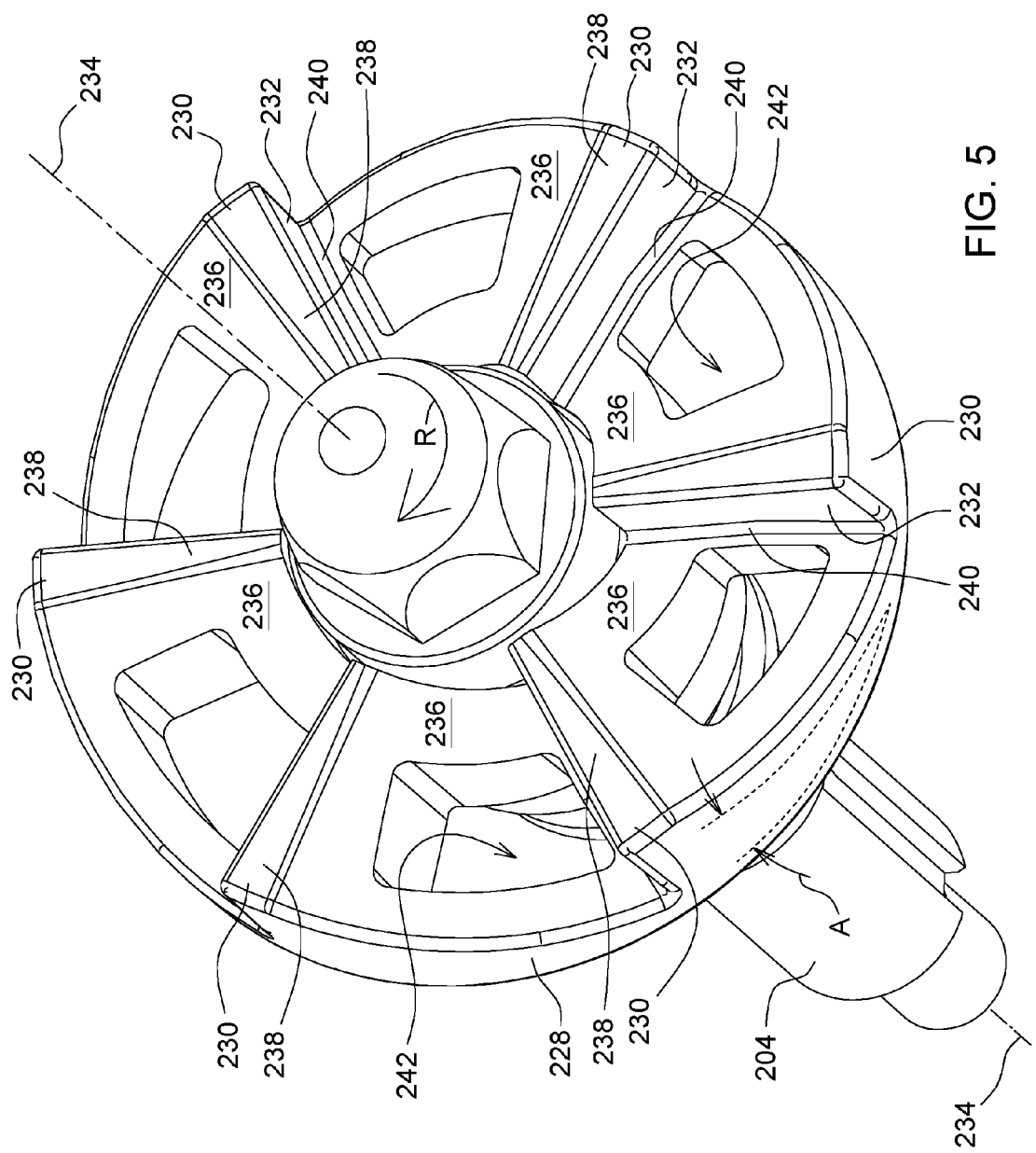
FIG. 5 is a perspective detailed view of a toothed cog of the conveyor drive of FIGS. 2-4.

The first coupling element 208 is shown in detail in FIG. 5. The first coupling element 208 is supported on output shaft 204, which is driven by the conveyor drive 112. The shaft 204 is driven in rotation by the conveyor drive 112. The first coupling element 208 has a disk 228 that is generally planar, circular, and that extends generally radially outward from the shaft 226. Six teeth 230 are fixed to the surface of the disk 228. These six teeth 230 engage six identically configured teeth 230' on the second coupling element 210. The six teeth 230' are constructed the same as the six teeth 230.

Each tooth 230 is defined by a surface 232 that faces in the direction of rotation "R". The surface 232 extends in a radial direction outward from the axis of rotation of the first coupling element 208. The surface 232 also extends parallel to the rotational axis 234 of the first coupling element 208. The second coupling element 210 has an identical, parallel, and facing surface 232' that engages the surface 232 and that is driven by the surface 232 when the two coupling elements 208, 210 are pushed together into engagement.

Each tooth 230 is also defined by a surface 236 that extends from the peak 238 of one tooth 230 to the root 240 of an adjacent tooth 230. The surface 236 is disposed at angle "A" of between 25 degrees and 45 degrees with respect to a plane that is normal to the rotational axis 234 and normal to the disc 228. The surface 236 is generally helical about the rotational axis 234. The surface 236 of the first coupling element 208 engages a corresponding surface 236' of the second coupling element 210 when the two coupling elements are pushed together into engagement.

Since the first coupling element 208 may be submerged in grain when the two coupling elements are pushed into engagement, grain is trapped between the surfaces 232 and 232', as well as between the surfaces 236 and 236'. If sufficient grain is trapped between these surfaces, the first coupling element 208 in the second coupling element 210 will rotate with respect to each other and never engage.

To prevent this from happening, each tooth 230 has a hole 242 that extends completely through the surface 236 and the disc 228 (to which the tooth 230 is fixed). The hole 242 thus passes completely through the first coupling element 208. The hole 242 provides an exit for grain trapped between the first coupling element 208 and the second coupling element 210.

As the conveyor 104 is pivoted into its operating position about the pivoting conveyor support 106, the second coupling element 210 is pressed by the coil spring 214 into engagement with the first coupling element 208. The coil spring 214 provides steady pressure between the two coupling elements. The motion of the first coupling element 208 as it is driven by the conveyor drive 112 causes the grain disposed between the two coupling elements to shift under pressure, and to be expelled through the holes 242. As the grain is expelled, the two coupling elements move closer together under pressure of the coil spring 214 until they reach full engagement (as shown in FIG. 4).

The second coupling element 210 does not have holes corresponding to holes 242 of the first coupling element 208. Holes are not provided in the teeth 230' of the second coupling element in order to prevent grain from passing through the teeth 230' and accumulating behind the second coupling element, crushing the bellows 218, and preventing the second coupling element 210 from being pushed into the cylindrical shell 220. Thus, the only outlet for grain trapped between the first coupling element 208 and the second coupling element 210 as they are pressed together is downward and outward through the holes 242.

The claims define the invention, which is not limited to the specific embodiment or embodiments described herein. Obvious variations of the specific embodiments shown herein will be apparent to one skilled in the art.

We claim:

1. A conveyor and conveyor drive for filling a combine grain tank comprising:
    a chain and paddle conveyor disposed inside a generally vertical housing;
    an intermediate chamber in communication with the chain and paddle conveyor to receive grain from the chain and paddle conveyor;
    a gearbox that is fixed to and extends into the intermediate chamber, the gearbox driving a first coupling element around a first rotational axis, wherein the first coupling element is disposed inside the intermediate chamber, is generally circular, and has a first face defining a first plurality of teeth and a second opposing face; and
    an auger conveyor having an inlet and an outlet, wherein the auger conveyor comprises a conveyor tube and an auger disposed inside the conveyor tube, wherein the conveyor tube and the auger are dimensioned such that rotation of the auger within the conveyor tube conveys grain from the inlet to the outlet and wherein the auger is coupled to and driven by a second coupling element that is generally circular, and has a first face defining a second plurality of teeth;
    wherein each of the teeth of first coupling element is configured to engage with a corresponding tooth of the second coupling element to communicate torque from the first coupling element to the second coupling element and to drive the auger in rotation, and
    wherein each of the teeth of the first coupling element defines a through-hole extending completely through from the first face to the second opposing face of said each of the teeth, and further wherein the through-hole is large enough to permit grain being conveyed by the auger conveyor to pass therethrough.

2. The conveyor and conveyor drive for filling a combine grain tank of claim 1, wherein the auger conveyor is pivotally supported within the grain tank and is pivotable to a disengaged position in which the auger conveyor is separated from the intermediate chamber and wherein the teeth of the first coupling element are disconnected from the teeth of the second coupling element.

3. The conveyor and conveyor drive for filling a combine grain tank of claim 2, wherein the auger conveyor is pivotable to an engaged position in which the auger conveyor is coupled to the intermediate chamber and wherein the teeth of the first coupling element are drivingly coupled to the teeth of the second coupling element.

4. The conveyor and conveyor drive for filling a combine grain tank of claim 3, further comprising a cylindrical shell wherein the cylindrical shell is fixed to the auger conveyor, wherein the cylindrical shell surrounds the second coupling element in the disengaged position, and wherein the cylindrical shell surrounds both the first coupling element and the second coupling element in the engaged position.

5. The conveyor and conveyor drive for filling a combine grain tank of claim 3, wherein the second coupling element is slidably supported on the auger to translate to a plurality of operating positions on the auger in a direction parallel to the rotational axis of the auger.

6. The conveyor and conveyor drive for filling a combine grain tank of claim 5, further comprising a spring coupled to the auger and to the second coupling element, wherein the spring applies a spring force to the second coupling element in a direction toward the first coupling element.

7. The conveyor and conveyor drive for filling a combine grain tank of claim 6, wherein the spring force is communicated to grain disposed between the first coupling element and the second coupling element and wherein said spring force is sufficient to expel grain trapped between the teeth of the first coupling element and the teeth of the second coupling element.

8. The conveyor and conveyor drive for filling a combine grain tank of claim 1, further comprising:

a shaft fixed to the second coupling element, wherein the shaft is slidably supported in an aperture formed in a lower end of the auger;

a coil spring coiled about the shaft to preload the second coupling element; and a bellows extending about the shaft and disposed to prevent grain from entering between the shaft and the aperture.

9. The conveyor and conveyor drive for filling a combine grain tank of claim 1, wherein each of the teeth of the first coupling element defines a first surface that extends radially outward from a rotational axis of the first coupling element and extends in a direction generally parallel to the rotational axis, and further wherein each of the teeth of the first coupling element defines a second surface that is generally helical with respect to the rotational axis and is disposed at an angle of between 25 degrees and 45 degrees with respect to a plane that is normal to the rotational axis.

10. The conveyor and conveyor drive for filling a combine grain tank of claim 9, wherein the through-hole of each tooth is formed in the second surface and extends in a direction parallel to the rotational axis of the first coupling element.

11. An auger for use with a conveyor drive having a first coupling element, the auger comprising:
an auger shaft extending along an axis and supporting vanes helically extending about the axis;
a second coupling element coupled to the shaft and having a face to oppose and engage the first coupling element, wherein the second coupling element comprises at least one aperture extending completely through the second coupling element in a direction parallel to the axis, wherein the second coupling element is configured to engage the first coupling element to transmit torque between the first coupling element and the second coupling element to convey grain while the at least one aperture remains open for the passage of grain therethrough, wherein the face comprises teeth to engage the first coupling element and wherein the at least one aperture extends through at least one of the teeth.

12. The auger of claim 11, wherein the second coupling element is slidably supported with respect to the auger shaft.

13. The auger of claim 12 further comprising a spring operably coupled between the auger shaft and the second coupling element to resiliently bias the second coupling element in a direction along the axis.

14. The auger of claim 11 further comprising a cylindrical shell extending about the second coupling element, the cylindrical shell having an inner surface forming a grain flow passage, wherein the at least one aperture is completely surrounded by the second coupling element, the least one aperture having an outermost interior surface spaced from and radially inward of the inner surface.

15. The auger of claim 11 further comprising a conveyor tube receiving the auger, wherein the second coupling element completely surrounds the at least one aperture, the second coupling element extending between the at least one aperture and the conveyor tube.

16. A conveyor drive and auger system for filling a combine grain tank, the system comprising:
a conveyor drive having a first coupling element;
an auger comprising:
an auger shaft extending along an axis and supporting vanes helically extending about the axis; and
a second coupling element coupled to the auger shaft and having a face to oppose and engage the first coupling element to transmit torque about the axis between the first coupling element to the second coupling element, wherein the second coupling element comprises at least one aperture extending completely through the coupling element in a direction parallel to the axis, wherein the second coupling element is configured to engage the first coupling element to transmit torque between the first coupling element and the second coupling element to convey grain while the at least one aperture remains open for the passage of grain therethrough; and
a conveyor tube extending about and receiving the auger shaft, the vanes and the second coupling element, the conveyor tube having an inner surface forming a grain flow passage, wherein the at least one aperture has an outermost interior surface spaced from and radially inward of the inner surface.

17. The system of claim 16, wherein the first coupling element comprises first teeth and wherein the second coupling element member comprises second teeth in engagement with the first teeth and wherein the at least one aperture extends through at least one tooth of the second teeth.

18. The system of claim 17, wherein the first coupling element is supported by a second coupling element supporting shaft extending through an opening in the auger shaft, the auger further comprising a bellows between the second coupling element and the auger shaft, wherein the bellows seals the opening through which the second coupling element supporting shaft extends and wherein the bellows compresses during axial movement of the second coupling element along the axis.

19. The system of claim 16, wherein the first coupling element omits any openings opposite to, connected to and extending from the at least one aperture such that grain cannot pass through the first coupling element.

20. The system of claim 16, wherein the first coupling element is supported by a second coupling element supporting shaft extending through an opening in the auger shaft, the auger further comprising a bellows between the second coupling element and the auger shaft, wherein the bellows seals the opening through which the second coupling element supporting shaft extends and wherein the bellows compresses during axial movement of the second coupling element along the axis.

* * * * *